United States Patent
Swersky

(10) Patent No.: US 6,193,298 B1
(45) Date of Patent: Feb. 27, 2001

(54) WIND BAFFLE ATTACHABLE TO SEATS USING STRAPS

(76) Inventor: Robert Swersky, 1201 Northern Blvd., Manhasset, NY (US) 11030

( * ) Notice: Subject to any disclaimer, the term of this patent is extended or adjusted under 35 U.S.C. 154(b) by 0 days.

(21) Appl. No.: 09/491,311

(22) Filed: Jan. 25, 2000

(51) Int. Cl.$^7$ ........................................... B60J 1/20
(52) U.S. Cl. ........................................ 296/85; 296/180.1
(58) Field of Search ................................. 296/180.1, 85

(56) References Cited

U.S. PATENT DOCUMENTS

| | | | |
|---|---|---|---|
| 2,514,082 | * | 7/1950 | Menrath . |
| 4,850,637 | | 7/1989 | Carlino ............................ 296/180.1 |
| 5,024,481 | | 6/1991 | Swersky ............................ 296/180.1 |
| 5,211,718 | * | 5/1993 | Gotz et al. ........................ 296/180.1 |
| 5,219,201 | * | 6/1993 | Gotz et al. ........................ 296/180.1 |
| 5,253,916 | * | 10/1993 | Moore et al. ...................... 296/180.5 |
| 5,702,150 | * | 12/1997 | Reuter et al. ..................... 296/180.1 |
| 5,707,099 | * | 1/1998 | Schrader et al. .................. 296/180.1 |
| 5,791,725 | | 8/1998 | Swersky ............................ 296/180.1 |
| 5,899,521 | * | 5/1999 | Pfertner et al. ................... 296/180.1 |
| 5,927,791 | * | 7/1999 | De Voe ............................. 296/78.1 |

* cited by examiner

Primary Examiner—D. Glenn Dayoan
Assistant Examiner—Mickki D. Murray
(74) Attorney, Agent, or Firm—Collard & Roe PC

(57) ABSTRACT

A wind baffle for convertible automobiles including a baffle sheet, straps for affixing the baffle sheet to a pair of opposed regions in the interior of the automobile such that the baffle sheet can be held in place behind the front seat compartment of the convertible automobile to prevent wind currents from passing from the rear of the convertible automobile to the front seat compartment, the opposed regions situated on an axis, and a device for adjustably affixing the baffle sheet to a third region in the automobile interior situated outside of the axis for preventing movement of the baffle sheet about the axis.

18 Claims, 4 Drawing Sheets

WIND BAFFLE ATTACHABLE TO SEATS USING STRAPS

FIELD OF THE INVENTION

The present invention relates generally to wind baffles, and more particularly, to wind baffles for convertible automobiles.

BACKGROUND OF THE INVENTION

The present invention relates to a wind baffle which is adapted to be removably installed behind the front seats of a convertible automobile which is adjustable for different heights of the seats and which is adjustable to different angles to eliminate glare.

A problem which has existed since the introduction of convertible automobiles has been that, as the automobile moves in a forward motion, air flows over the windshield and heads of the occupants of the front seat area, thus producing a lower air pressure zone in the front seat area. Consequently, reverse air currents travel between the front seats and head rests producing turbulence. These reverse air currents can have a number of negative effects on the occupants' driving experience. For example, the hair styles of the occupants are disturbed; the occupants experience difficulty in carrying on a normal conversation; the occupants are chilled on cool days; and the occupants' belongings are blown around the front seat area and possibly from the front seat compartment of the automobile.

Various attempts have been made to solve the aforementioned problems. For example, in U.S. Pat. No. 5,024,481, it was suggested to provide a sheet of rigid, transparent material behind the front seat compartment via an adjustable horizontal rod having ends attachable to the respective inner side body surfaces of the automobile in order to prevent wind currents from passing from the rear of the automobile into the front seat compartment.

In addition, in U.S. Pat. No. 5,791,725, it was suggested to provide a substantially vertical rod to the above arrangement having one end attachable to the sheet and the other end attachable to the floor or back seat of the automobile in order to further stabilize the sheet while the car is in motion. This vertical rod has been shown to be adjustable in length in order to make the wind baffle compatible with cars having differing seat heights.

Moreover, in U.S. Pat. No. 4,850,637, it was suggested to provide a baffle sheet which is removably attachable to the bucket seats or a bench seat of a convertible automobile utilizing strap means. The strap means include, for example, belts for wrapping around a portion of the bucket or bench seats of the automobile. To provide further support during use, the baffle sheet has been formed to extend downward to the automobile floor and be either permanently or temporarily affixed to the floor of the automobile.

OBJECTS AND SUMMARY OF THE INVENTION

The devices described above, however, have several disadvantages. For example, as the reverse air currents contact the rigid sheet of the first device, the sheet is caused to rotate around the horizontal rod attached to the sheet. As such, the upper portion of the sheet becomes pressed against the head rests of the front seats thereby bothering the occupants of the car. Another disadvantage is that the sheet must be custom-made to fit a specific car. That is, the sheet must to be cut so that the top of the sheet reaches a desired point.

A disadvantage of the second device is that, in view of the multiple parts needed to construct the device, it is quite costly to manufacture. Moreover, the multiple parts cause the device to be relatively heavy and therefore difficult to maneuver and install.

A disadvantage of the third device is that, since the baffle sheet extends downward to the automobile floor, it is non-adjustable in the vertical direction and therefore cannot be adjusted in order to be compatible with cars having varying seat heights. Further, as the sheet is typically formed from a transparent plastic material, a glare is often created at night by the lights from the dashboard.

However, since the strip is not adjustable and is permanently fixed to the floor of the automobile, the sheet cannot be tilted in order to eliminate such glare.

It is therefore an object of the present invention to provide a wind baffle which prevents wind currents from passing from the rear of a convertible automobile between the front seats and headrests into the front seat compartment wherein the height of the wind baffle is adjustable and wherein the wind baffle is prevented from pivoting around the horizontal axis of the baffle sheet.

It is a further object of the invention to provide a wind baffle which is inexpensive to manufacture and which is simple to install.

It is an additional object of the invention to provide a wind baffle which can be tilted in order to eliminate glare created by the lights of the dashboard of the automobile.

These and other objects of the present invention which will become apparent from the following description are achieved by the wind baffle of the present invention which comprises a baffle sheet and means for affixing the baffle sheet in place behind the front seats of the convertible automobile to prevent wind currents from passing from the rear of the convertible automobile to the front seat compartment. The affixing means include at least one strap which is attachable to the baffle sheet and to either a portion of at least one of the front seats or to a roll bar of the convertible automobile. A substantially vertical rod assembly is also included having a first end affixed to the baffle sheet and a second end attachable to either the floor or the rear seat of said convertible automobile for enabling the baffle sheet to be positionally adjustable in the vertical direction in order to be compatible with cars having varying seat heights.

In a preferred embodiment of the invention, the affixing means includes two straps which are inserted through apertures in the baffle sheet and which are secured to portions of the headrests of the front seats of the automobile. The vertical rod assembly includes a tube having a first end affixed to the baffle sheet and a second free end, an extension tube having a first end which is slidably insertable into the second free end of the tube and a second end which extends from the second free end of the tube and means for locking the extension tube at a desired position in the tube.

The straps are wrapped around the bar attaching the headrests to the front seats of the convertible automobiles. However, in other embodiments of the invention, the straps are wrapped around the headrests of the front seats or to a roll bar of the convertible automobile.

In order to affix the baffle sheet to the front seats of the convertible automobile, a first end of each of the straps is fed through the slots of the baffle sheet which are then wrapped around a portion of each headrest. The first end of each strap is fastened to the second end of each strap in a snug manner to thereby secure the baffle sheet to the front seats. In a preferred embodiment of the invention, the first end of each strap is fastened to the second end of each strap by Velcro®.

BRIEF DESCRIPTION OF THE DRAWINGS

A more complete appreciation of the present invention and many of the attendant advantages thereof will be readily understood by reference to the following detailed description when considered in connection with the accompanying drawings in which.

DETAILED DESCRIPTION OF THE INVENTION

Figure 1:
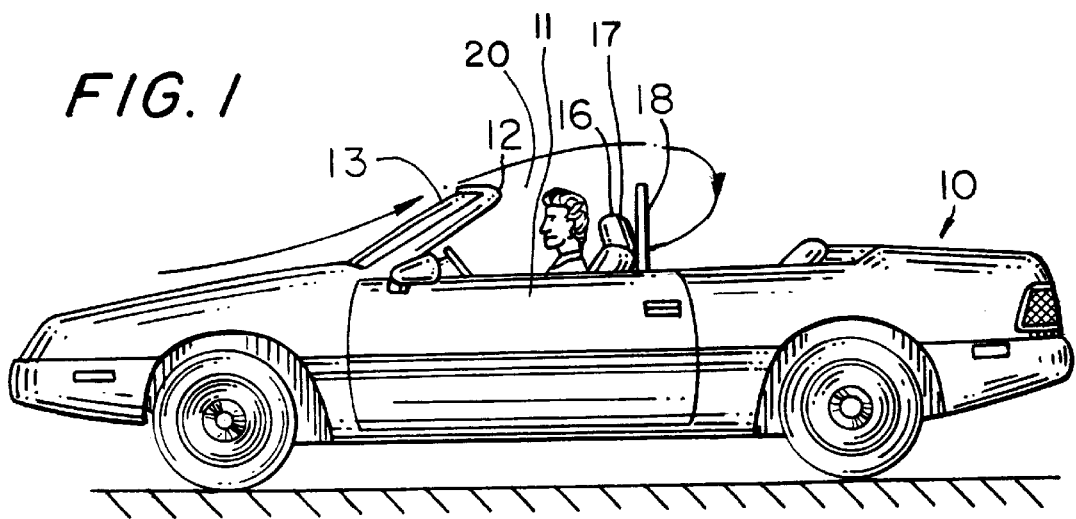
FIG. 1 is a side elevational view of a convertible automobile having a wind baffle in accordance with the present invention mounted therein.
Figure 2:
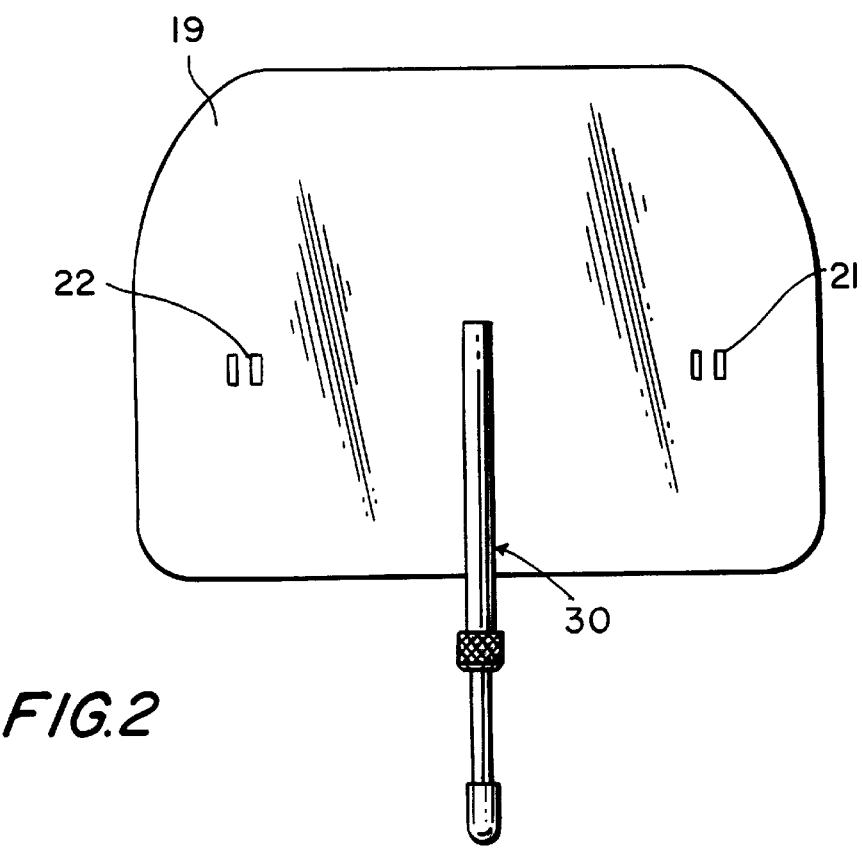
FIG. 2 is a front view of the wind baffle shown in FIG. 1.

Referring to the drawings, wherein like reference characters designate identical or corresponding parts throughout the various views, FIG. 1 shows a convertible automobile generally designated 10 having, among other things, opposite side doors 11, a windshield assembly 12 comprising a windshield 13, and front seats 16 and 17, all of which form the front seat passenger compartment 20. When the automobile is moving in a forward direction, wind currents are deflected over the windshield 13 and are caused to flow over the front seat passenger compartment, thus creating a lower air pressure zone therein.

Figure 3:
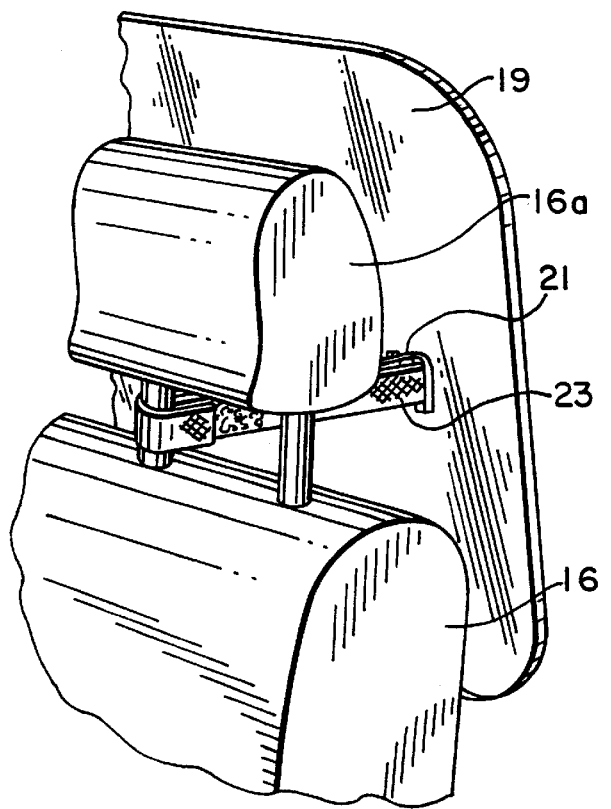
FIG. 3 is a partial perspective view of the wind baffle shown in FIG. 1 in a mounted position.
Figure 4:
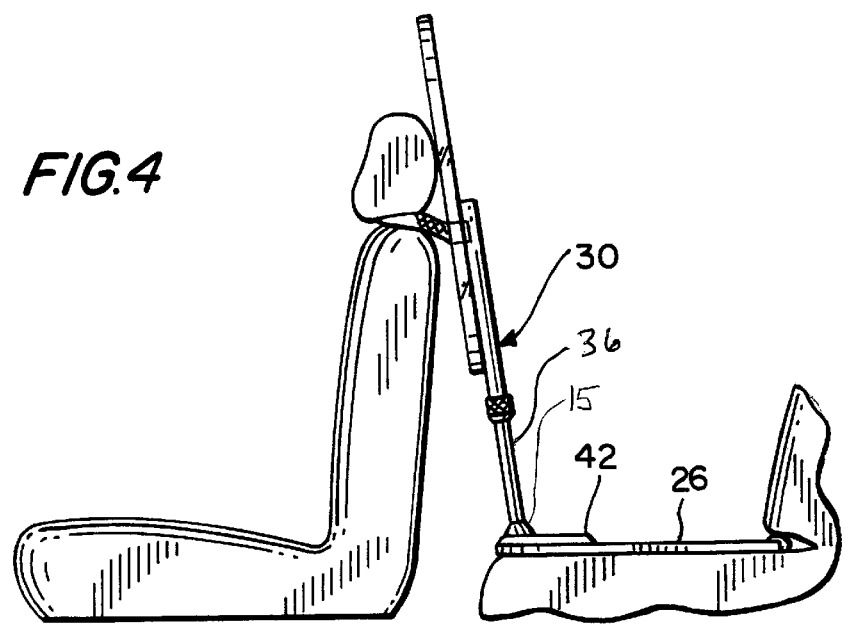
FIG. 4 is a side view of the wind baffle shown in FIG. 1 in a mounted position.

As shown in FIGS. 2–8, the wind baffle 18 comprises an acrylic baffle sheet 19. Two pairs of slots 21, 22 are formed in the baffle sheet 19, each pair of slots being formed on a respective side portion of the baffle sheet. An adjustable, substantially vertical, rod assembly 30 is affixed to one side surface of baffle sheet 19 having one end that projects beyond the lower edge of baffle sheet 19 and is adapted to bear against either the rear seat or floor 26 of the automobile (FIG. 4). As shown in FIG. 1, the wind baffle 18 prevents reverse air currents from traveling from the rear of the car between the front seats and the head rests, thus preventing turbulence within the front seat passenger compartment 20.

Figure 8:
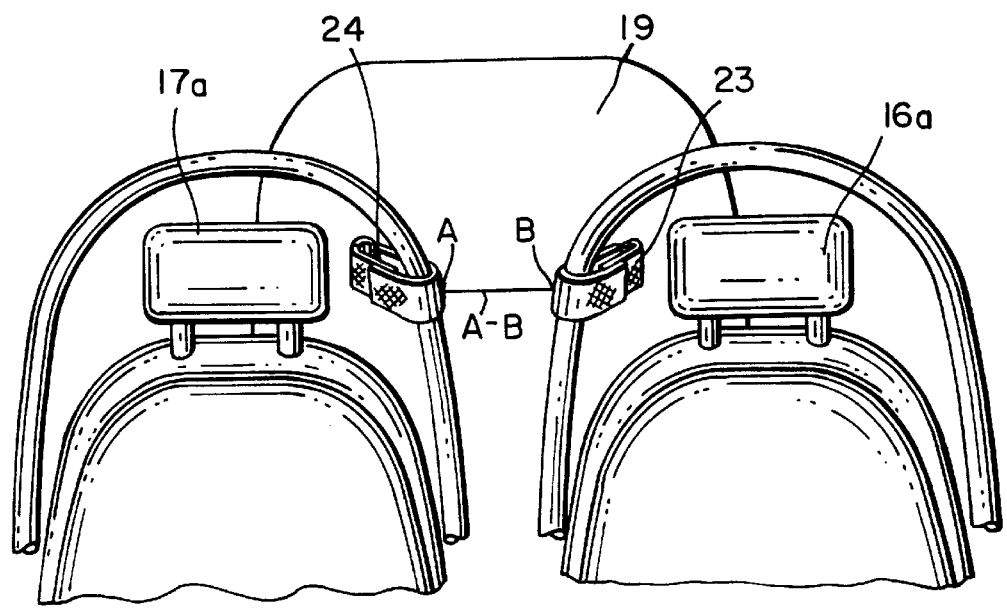
FIG. 8 is a front view of a wind baffle in accordance with still another embodiment of the present invention in a mounted position.

In a preferred embodiment of the invention, the width of baffle sheet 19 is made such that it extends between the approximate centers of the respective front seat headrests 16a and 17a (e.g., FIG. 8). Such an arrangement yields the advantageous features of making it convenient for a person in the front seat to place items such as packages on a shelf or seat in the rear compartment and enables sound originating in the rear compartment, e.g. from a stereophonic speaker, to be easily heard in the front seat compartment. Using a wider sheet, e.g., a sheet which extends beyond the outer edges of the seats, would diminish or eliminate these advantages while the use of a narrower sheet leads to a greater, perhaps unacceptable, level of turbulence in the front seat compartment. As such, baffle sheet 19 is formed to have a width of about 20 inches to about 40 inches, preferably 30 inches, and a height of about 10 inches to about 30 inches, preferably 20 inches.

The baffle sheet 19 is preferably formed from a transparent acrylic material but can also be tinted in order to reduce glare or for aesthetic purposes. In addition, the baffle sheet 19 can be formed from a mesh material in order to eliminate glare altogether. However, forming the baffle sheet from mesh allows a moderate amount of wind to penetrate the sheet thereby reducing the effectiveness of the invention.

As shown in FIG. 3, baffle sheet 19 is affixed to the back sides of front seats 16 and 17 through the use of straps 23, 24. While seat 17 and strap 24 are not shown in FIG. 3, the arrangement is identical to that shown with respect to seat 16 and strap 23. These straps are preferably straps of one wrap Velcro® being about 1 inch wide and 18 inches long. In this manner, hooks are arranged on one entire side of each strap and loops are arranged on the other entire side of each strap such that each strap can be formed into a continuous loop by fastening the "hook" side of one end of a strap to the "loop" side of the other end of the strap. The measurements of these straps can be varied as long as the straps are long enough to be wrapped around a portion of the front seats of the automobile and as long as the straps are of a sufficient width to be strong yet able to fit within the slots of the baffle sheet.

It should be recognized that, rather than straps of one wrap Velcro®, for use in connection with this invention, a conventional belt and belt buckle, an elastic strap, or other similar means, may also be employed for encircling portions of the front seats.

In order to affix the baffle sheet 19 to the front seats 16 and 17, which will be discussed in further detail below in connection with the method for installing the wind baffle 18, a first end of each of the straps 23, 24 is fed through slots 21, 22, respectively, as shown in FIG. 3. The first ends of the straps are then wrapped around a portion of each headrest 16a, 17a, respectively. In the embodiment shown, the straps are wrapped around the bars of the headrests which attach the headrests to the seats. Lastly, the first end of each strap is fastened to the second end of each strap in a snug manner to thereby secure the baffle sheet 19 to the front seats.

The pairs of slots are formed in the baffle sheet such that they align with the location of typical seats in a convertible automobile. The slots are formed in a vertical manner substantially parallel to one another. However, in another embodiment of the invention discussed further below, the slots can be formed in a horizontal manner.

As stated above, in the preferred embodiment of the invention, the straps are affixed to the sheet via the slots formed in the sheet. Alternatively, in another embodiment, the straps are permanently affixed to the sheet (not shown). However, the former embodiment is preferred since the Velcro® formed on the straps can "wear out" and, forming the straps to be removable from the sheet allows the straps to be easily replaced if necessary.

Figure 5:
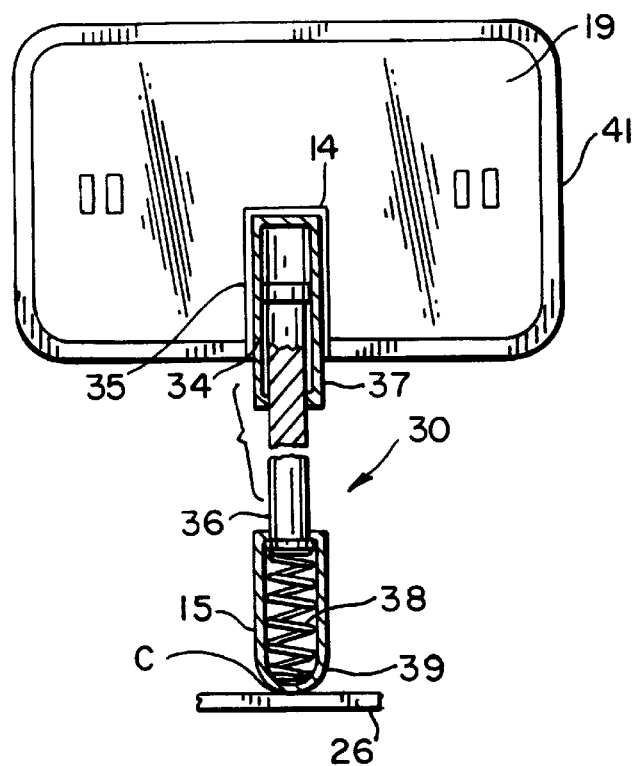
FIG. 5 is a front view in partial section of the wind baffle shown in FIG. 1.

Referring to FIGS. 4 and 5, vertical rod assembly 30 is a telescoping, spring-biased rod assembly. As stated earlier, vertical rod assembly 30 is attached to sheet 19 and has a free end 15 adapted to bear against either the rear seat or the floor of the automobile 26. With this arrangement, baffle sheet 19 is prevented from rotating about axis A-B (FIG. 8) on which straps 23, 24 are situated as the wind current hits baffle sheet 19. Vertical rod assembly 30 is formed of an aluminum tube 34 secured within acrylic tube 35, and an aluminum extension tube 36, slidably inserted into tube 34.

Extension tube 36 is arranged so that the wind baffle can be adjusted to fit automobiles of differing heights and so that the wind baffle can be tilted in order to eliminate any glare created by the lights of the dashboard at night. One end of tube 34 comprises locking means 37 which allows extension tube 36 to be locked at a desired position within tube 34. Locking means 37 is preferably an aluminum or Delrin® lock nut.

In a preferred embodiment of the invention, vertical rod assembly 30 also includes spring tensioning means for applying an outward pressure upon the floor or rear seat of the automobile. As shown in FIG. 5, spring 38 is secured to the end of extension tube 36 and cap member 39 is slidably mounted over both spring 38 and the end of extension tube 36.

In accordance with another feature of the invention, an edge-protector 41 is provided on the perimeter of baffle sheet 19 for preventing damage to the baffle sheet. In addition, edge-protector 41 shields the user from injury while handling the wind baffle. Edge-protector 41 is preferably formed of vinyl or metal. However, other materials can be used such as rubber.

Figure 6:
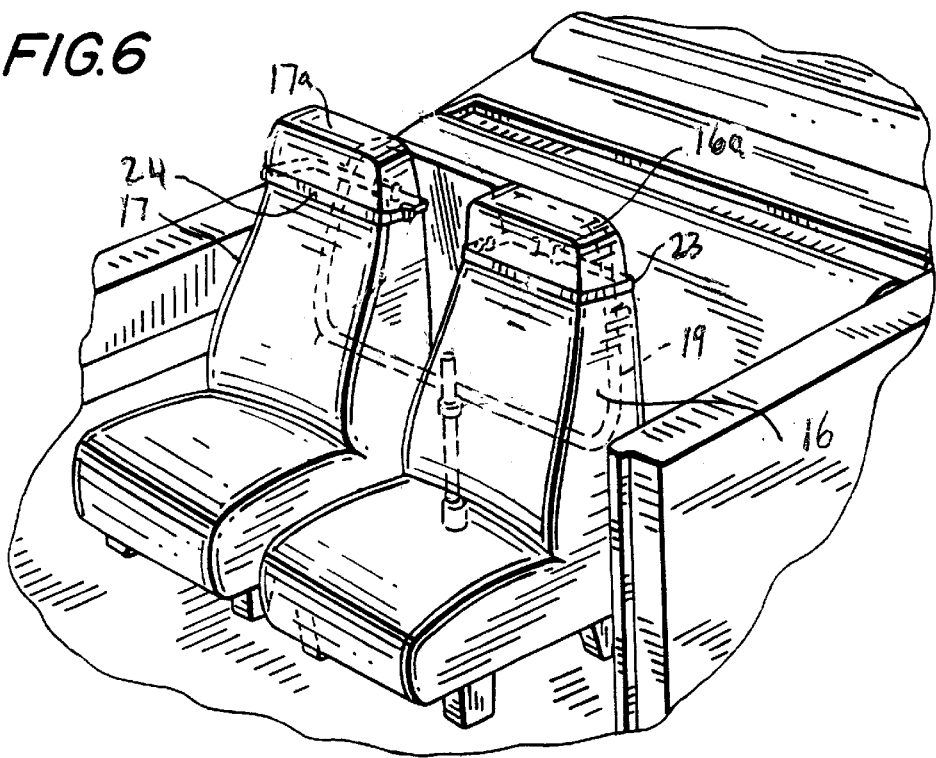
FIG. 6 is an elevational view of a convertible automobile having a wind baffle in accordance with another embodiment of the present invention mounted therein.
Figure 7:
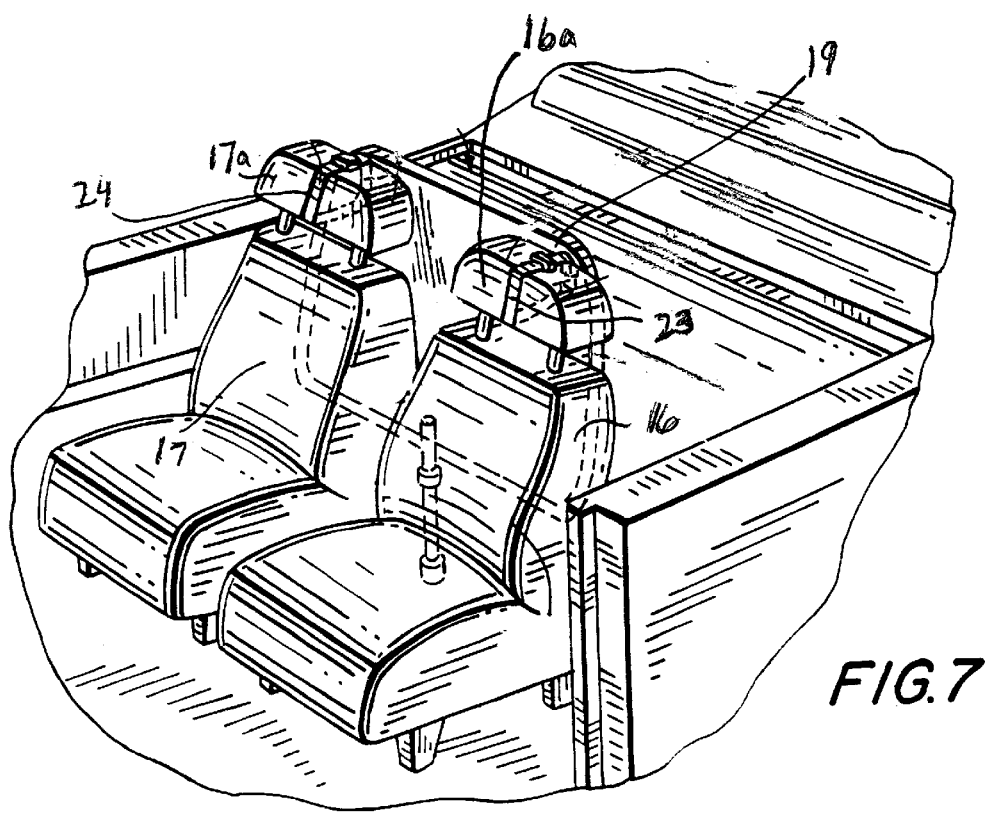
FIG. 7 is an elevational view of a convertible automobile having a wind baffle in accordance with yet another embodiment of the present invention mounted therein.

The wind baffle 18 assembled to the convertible automobile is shown in FIGS. 6, 7 and 8. As shown, baffle sheet 19 is positioned so that it extends between the approximate centers of the respective front seat headrests 16a, 17a and so that its top extends slightly past the top of the headrests. Once baffle sheet 19 is positioned in the desired location, a first end of each of the straps 23, 24, which were previously inserted through slots 21, 22, is wrapped around a portion of front seats 16, 17, respectively. The straps can be wrapped around either the headrest (FIGS. 6 and 7), the bar connecting the headrest to the seat (FIG. 3), or the roll bar (if included) (FIG. 8). The first end of each strap is then secured to the other end of each strap. The straps must be secured tightly so that the baffle sheet 19 is pressed firmly against the rear side of the front seats.

The method of securing the straps to the front seats is dictated predominantly by the construction of the particular seat. It is preferred that the straps be secured to either the bars connecting the headrest to the seat or to the roll bar in order to minimize any contact the straps may have with the heads of the occupants of the automobile. However, if necessary, the straps can be secured around the headrests themselves. If the slots of the baffle sheet are formed in a vertical manner, then the straps will be wrapped around the width of the headrests as shown in FIG. 6. However, if the slots are formed in a horizontal manner, the straps will be wrapped around the height of the headrests as shown in FIG. 7.

Foam rubber leg-support 42 is situated on either the rear seat cushion or on the floor panel of the automobile (FIG. 4) and extension tube 36 of vertical rod assembly 30 is adjusted and locked in place so that its tip rests on leg-support 42 with a moderate tension. If the car is being driven at night, the car's ignition should first be turned on and the driver should check whether the lights emanating from the dashboard are causing a glare in the baffle sheet. If so, the vertical rod assembly should be lengthened so that the baffle sheet can be tilted slightly in either direction in order to eliminate the glare. It is pointed out that leg-support 42 can be eliminated, if desired, and vertical rod assembly 30 can rest directly on the rear seat or floor panel of the automobile.

In another embodiment of the invention, a socket (not shown) can be affixed to the rear seat or floor of the automobile in which cap member 39 of vertical rod assembly 30 can rest. The socket is preferably secured to using Velcro® which can be attached to the socket and floor or seat of the automobile.

Obviously, numerous modifications and variations of the present invention are possible in light of the teachings hereof. Therefore, it is to be understood that the invention can be varied from the detailed description above within the scope of the claims appended hereto.

I claim:

1. A wind baffle for convertible automobiles having front seats, comprising:

a baffle sheet:

means for affixing said baffle sheet in place behind the front seats of the convertible automobile to prevent wind currents from passing from the rear of the convertible automobile to the front seat compartment, said affixing means comprising two straps and two pairs of apertures formed in the baffle sheet such that each strap is positionable within one of said apertures each strap having a first end and a second end and means for connecting said first end to said second end, wherein each strap is structured and arranged to be wrapped around a bar connecting a headrest to the front seat of the convertible automobile to affix the baffle to the convertible automobile; and a substantially vertical rod assembly having a first end affixed to said baffle sheet and a second end attachable to either the floor or the rear seat of said convertible automobile for enabling said baffle sheet to be positionally adjustable in the vertical direction in order to be compatible with cars having varying seat heights.

2. The wind baffle of claim 1, wherein said vertical rod assembly comprises:

a tube having a first end affixed to said baffle sheet and a second free end;

an extension tube having a first end which is slidably insertable into said second free end of said tube and a second end which extends from said second free end of said tube; and means for locking said extension tube at a desired position in said tube.

3. The wind baffle of claim 1, further comprising means for coupling said vertical rod assembly to a side of said baffle sheet.

4. The wind baffle of claim 2, wherein said vertical rod assembly further comprises spring tensioning means for applying an outward pressure to either the floor or the rear seat of said convertible automobile.

5. The wind baffle of claim 4, wherein said spring tensioning means further comprises a cap member adapted to be slidably mounted on said second end of said extension tube.

6. The wind baffle of claim 2, wherein said locking means comprise a lock nut.

7. The wind baffle of claim 1, wherein, after said straps are wrapped around the bars connecting the headrests to the front seat of the convertible automobile, the first and second ends of each strap are structured and arranged to be connected to one another in order to securely affix the baffle sheet to the rear surface of the front seats of the convertible automobile.

8. The wind baffle of claim 1, wherein the apertures are formed in a vertical manner substantially parallel to one another.

9. The wind baffle of claim 1, wherein the apertures are formed in a horizontal manner substantially parallel to one another.

10. A wind baffle for convertible automobiles having front seats and a roll bar, comprising:

a baffle sheet:

means for affixing said baffle sheet in place behind the front seats of the convertible automobile to prevent wind currents from passing from the rear of the convertible automobile to the front seat compartment, said affixing means comprising two straps and two pairs of apertures formed in the baffle sheet such that each strap is positionable within one of said apertures, each strap having a first end and a second end and means for connecting said first end to said second end, wherein each strap is structured and arranged to be wrapped around the roll bar of the convertible automobile to affix the baffle to the convertible automobile; and a substantially vertical rod assembly having a first end affixed to said baffle sheet and a second end attachable to either the floor or the rear seat of said convertible automobile for enabling said baffle sheet to be positionally adjustable in the vertical direction in order to be compatible with cars having varying seat heights.

11. The wind baffle of claim 10, wherein said vertical rod assembly comprises:

a tube having a first end affixed to said baffle sheet and a second free end;

an extension tube having a first end which is slidably insertable into said second free end of said tube and a second end which extends from said second free end of said tube; and means for locking said extension tube at a desired position in said tube.

12. The wind baffle of claim 10, further comprising means for coupling said vertical rod assembly to a side of said baffle sheet.

13. The wind baffle of claim 11, wherein said vertical rod assembly further comprises spring tensioning means for applying an outward pressure to either the floor or the rear seat of said convertible automobile.

14. The wind baffle of claim 13, wherein said spring tensioning means further comprises a cap member adapted to be slidably mounted on said second end of said extension tube.

15. The wind baffle of claim 11, wherein said locking means comprises a lock nut.

16. The wind baffle of claim 10, wherein, after said straps are wrapped around the roll bar of the convertible automobile, the first and second ends of each strap are structured and arranged to be connected to each other in order to securely affix the baffle sheet to the rear surface of the front seats of the convertible automobile.

17. The wind baffle of claim 10, wherein the apertures are formed in a vertical manner substantially parallel to one another.

18. The wind baffle of claim 10, wherein the apertures are formed in a horizontal manner substantially parallel to one another.

* * * * *